(12) United States Patent
Hironaka et al.

(10) Patent No.: US 6,574,085 B1
(45) Date of Patent: Jun. 3, 2003

(54) POWER SUPPLY APPARATUS FOR ELECTROSTATIC CHARGING AND METHOD FOR SAME

(75) Inventors: Yoshiaki Hironaka, Sayama (JP); Masao Iwata, Yokosuka (JP); Kiyoshige Enomoto, Yokosuka (JP)

(73) Assignees: Oppama Industry Co., Ltd., Yokosuka (JP); Kioritz Corporation, Tokyo (JP)

( * ) Notice: Subject to any disclaimer, the term of this patent is extended or adjusted under 35 U.S.C. 154(b) by 140 days.

(21) Appl. No.: 09/655,814

(22) Filed: Sep. 6, 2000

(30) Foreign Application Priority Data

Sep. 16, 1999 (JP) .......................... 11-261859

(51) Int. Cl.[7] ................ F02P 3/08; H05B 3/00
(52) U.S. Cl. ................ 361/227; 361/228; 239/690
(58) Field of Search ................ 361/226, 227, 361/228; 118/621; 239/690, 706; 123/490, 478

(56) References Cited

U.S. PATENT DOCUMENTS

| | | | | |
|---|---|---|---|---|
| 3,723,809 A | * | 3/1973 | Fujii ................ | 123/149 A |
| 3,911,886 A | * | 10/1975 | Nagasawa ................ | 123/599 |
| 4,478,200 A | | 10/1984 | Nagashima et al. ........ | 123/605 |
| 5,515,681 A | * | 5/1996 | DeFreitas ................ | 60/740 |
| H1691 H | | 11/1997 | Ono et al. ................ | 239/3 |

* cited by examiner

Primary Examiner—Kim Huynh
(74) Attorney, Agent, or Firm—Michael D. Bednarek; Shaw Pittman LLP

(57) ABSTRACT

A power supply apparatus for electrostatic charging sprayed liquids from a spraying apparatus and method for same, the apparatus including a rotor having a magnet and magnetic poles, a booster coil assembly facing the rotor, for inducing high voltage AC pulses during the rotation of the rotor, and a rectifier for rectifying the high voltage AC pulses induced by the booster coil assembly to high voltage DC pulses and for supplying the high voltage DC pulses to a charging electrode. The power supply apparatus provides a compact and lightweight power generator system, thus eliminating cumbersome operations such as replacement or recharging of a large battery. In addition, a lighter weight and simplified operation reduces the burden on users and facilitates more efficient spraying.

19 Claims, 3 Drawing Sheets

POWER SUPPLY APPARATUS FOR ELECTROSTATIC CHARGING AND METHOD FOR SAME

BACKGROUND OF THE INVENTION

1. Field of the Invention

The present invention generally relates to devices that use electrostatic charging, such as an electrostatic sprayer for spraying liquid chemicals, paint, etc. charged with static electricity. More specifically, the present invention relates to a power supply apparatus that supplies high voltage DC (direct current) pulses to a charging electrode, and to a method for supplying power for electrostatic charging.

2. Description of the Related Art

As is known in the art, a typical electrostatic sprayer has a spray nozzle including, for example, a high-potential annular electrode disposed downstream thereof. Using the charging electrode, this conventional electrostatic sprayer electrostatically charges liquids such as chemicals as they are sprayed. The charged, sprayed chemicals adhere well to agricultural crops and the like, and provide the improved effectiveness of bactericide, insecticide, etc.

The typical electrostatic sprayer is generally used in the field, and for this purpose employs a portable battery as a power supply for the sprayer. In operation, a DC (direct current) voltage of this battery is boosted, and is then continuously applied to the annular electrode serving as a charging electrode positioned in the vicinity of the spray nozzle.

However, the typical electrostatic sprayer suffers from several drawbacks. For instance, the typical electrostatic sprayer requires a large battery and includes complicated, expensive electric circuits and devices to boost a battery voltage. In addition, a constant high voltage direct current must be continuously supplied to the electrode, which places a high load on the battery and drains the battery charge quickly. Thus, frequent replacement or recharging of the large battery is required. Further, the heavy weight of the battery makes a handheld or shoulder-type electrostatic sprayer bulky and less maneuverable. In the end, the heavy weight exhausts the operator and renders application procedures less efficient overall.

SUMMARY OF THE INVENTION

In light of the foregoing problems, the present invention provides a power supply apparatus for electrostatic charging which is suitable for use in a handheld device that uses electrostatic charging, such as an electrostatic sprayer or similar device. The power supply apparatus produces a pulsed DC high voltage, thereby remarkably reducing a load on the power supply. Further, to operate, for example, a pump in the sprayer, the power supply apparatus uses a compact and lightweight power generator system, such as power generator systems of an igniter for an internal combustion engine. As a result, the present invention uses a small battery and, thus, eliminates cumbersome operations such as the replacement and recharging of a large battery. In addition, the present invention reduces the burden on a user and makes spraying more efficient.

In one aspect of the present invention, a power supply apparatus for electrostatic charging According to the present invention supplies high voltage DC pulses to a charging electrode.

In another aspect, a power supply apparatus for electrostatic charging According to the present invention includes a rotor having a magnet and magnetic poles, a booster facing the rotor, for inducing high voltage AC (alternating current) pulses during rotation of the rotor, and a rectifier for rectifying the high voltage AC pulses induced by the booster to high voltage DC pulses and for supplying the high voltage DC pulses to a charging electrode. With these features, the power supply apparatus of the present invention provides a compact and lightweight power generator system that eliminates the need for a large battery and the associated cumbersome replacement and recharging operations. In addition, the present invention reduces the physical burden on the operator and improves work efficiency.

According to a preferred embodiment of the present invention, the rectifier comprises a high voltage diode or diodes, for the half-wave or full-wave rectifying of the high voltage AC pulses induced by the booster. The high voltage diode may be used to convert high voltage AC pulses to high voltage DC pulses, enabling the resulting high voltage DC to be supplied to the charging electrode in a stable manner.

According to a preferred embodiment of the present invention, the rotor is driven by an internal combustion engine. As such, the rotor of the power supply apparatus faces an ignition coil assembly of an igniter of the internal combustion engine. As the rotor turns and the magnet and magnetic poles pass the ignition coil assembly, the ignition coil assembly generates high voltage pulses and supplies the pulses to an ignition plug of the internal combustion engine. Thus, conventional internal combustion engines can be easily adapted to operate the power supply apparatus of the present invention. For example, in an internal combustion engine that drives a liquid chemical pump, the igniter rotor of the engine may be conveniently used to supply a predetermined power to a charging electrode.

Therefore, the power supply apparatus of the present invention, using a pulsed high voltage, remarkably reduces consumption of electric power as compared to a conventional constant voltage power supply.

Accordingly, an object of the present invention is to provide a compact and lightweight power supply apparatus for handheld devices that use electrostatic charging, such as portable electrostatic chemical sprayers.

Another object of the present invention is to provide an electrostatic charging power supply apparatus that can be driven by an internal combustion engine.

Another object of the present invention is to provide a power supply apparatus that supplies high voltage DC pulses to a charging electrode.

These and other objects of the present invention are described in detail in the detailed description of the invention, the appended drawings, and the attached claims.

DESCRIPTION OF THE PREFERRED EMBODIMENTS

Now, preferred embodiments of the present invention will be described with reference to the Accompanying drawings.

Figure 1:
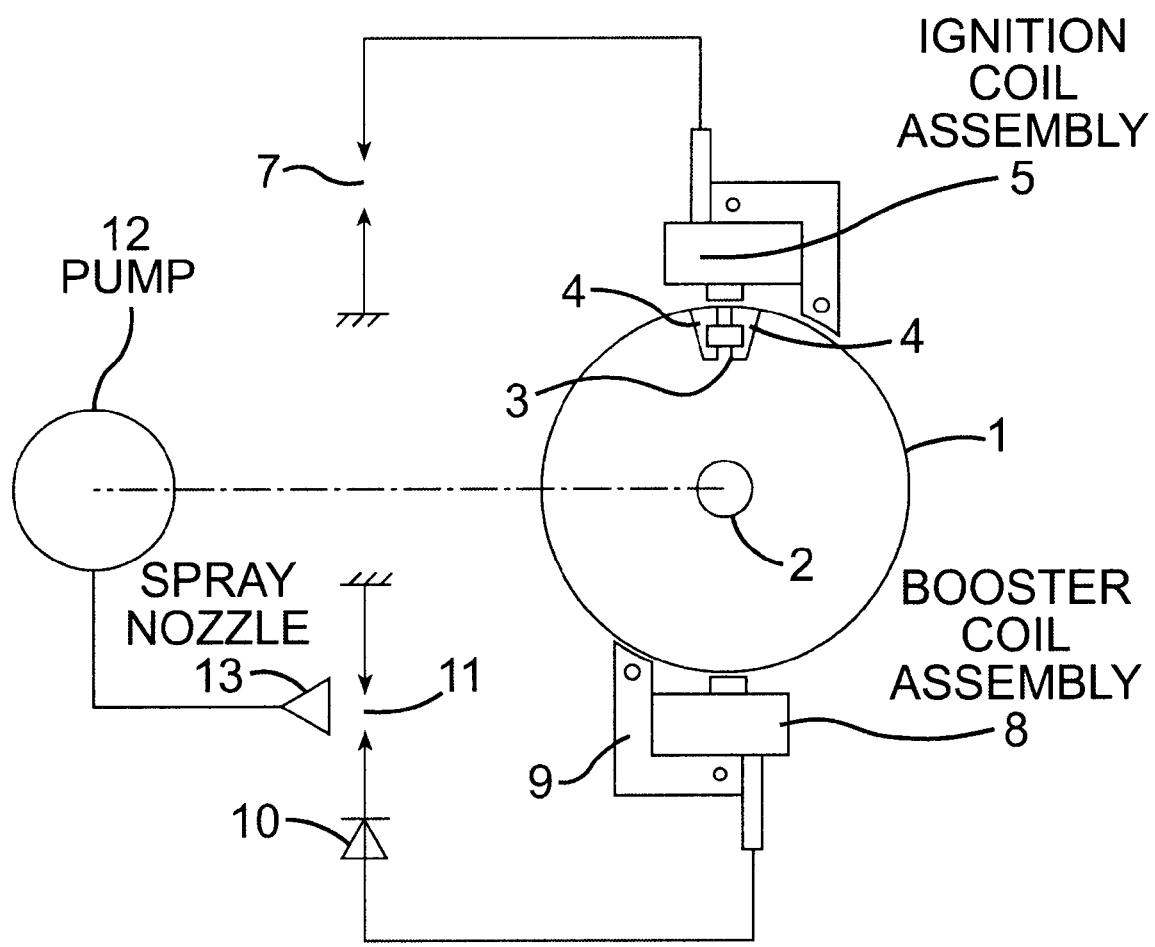
FIG. 1 is a schematic circuit diagram of a power supply apparatus in an electrostatic sprayer According to one preferred embodiment of the present invention.

FIG. 1 is a schematic circuit diagram of a power supply apparatus According to one preferred embodiment of the present invention. In FIG. 1, According to this preferred embodiment, a rotor 1 is mounted to a crankshaft 2 of an air-cooled 2-cycle gasoline engine (not shown). The engine drives the crankshaft 2, which, in turn, rotates the rotor 1. The rotor 1 is used in an igniter for an internal combustion engine in a power sprayer. In this preferred embodiment, the power sprayer has a well known structure in which a pump 12 pumps liquid chemicals into a spray nozzle 13.

The rotor 1 is a disc made of non-magnetic material such as aluminum alloy. Embedded in the rotor 1 are a magnet 3 and two magnetic poles 4 that sandwich the magnet 3 therebetween. Having ignition coils used as a booster coil assembly, ignition coil assembly 5 is arranged close to the rotor 1, such that the ignition coil assembly 5 and the rotor 1 are in communication, e.g., magnetic communication. The ignition coil assembly 5 induces a pulsed high voltage in response to magnetic flux of the magnet 3 while the rotor 1 rotates. Each of the ignition coils is wound around a U-shaped core 6.

Connected to the ignition coil assembly 5 is an ignition plug 7 of the internal combustion engine. The ignition plug 7 produces sparks in response to high voltage pulses from the ignition coil assembly 5. The sparks ignite fuel in a cylinder. In turn, the internal combustion engine commences operation and/or continuously operates to drive the pump 12.

In the power supply apparatus shown in FIG. 1, the ignition coil assembly 5 generates high voltage AC pulses that are supplied to the ignition plug 7. Optionally, however, a magneto type igniter having well-known ignition coils or an ignition coil unit, or others such as a battery-ignition type igniter, may be used equally well. The high voltage ignition pulses may be produced by means of any circuit system, such as a capacitor discharge ignition (CDI) or a transistor controlled ignition (TCI).

A booster coil assembly 8 having booster coils is further arranged close to the rotor 1, such that the booster coil assembly 8 and the rotor 1 are in communication, e.g., magnetic communication. As the rotor 1 rotates upon Actuation of the internal combustion engine, each time the magnet 3 and the magnetic poles 4 pass by the booster coil assembly 8, the booster coil assembly 8 (of which each booster coil is wound around a core 9) generates a high voltage AC pulse.

Booster coil assembly 8 is connected to a charging electrode 11 via a high voltage diode 10. The arrangement is such that the cathode of the high voltage diode 10 is connected to a charging electrode 11 as shown in FIG. 1 when the leading edge of the voltage pulses generated by the booster coil assembly 8 rises. Conversely, when the leading edge of the generated voltage pulses falls, the anode of the high voltage diode 10 is connected to the charging electrode 11. The charging electrode 11 can be supplied with high voltage DC pulses (P) on the order of 10 kV to 15 kV.

In operation, initially, the rotor 1 is rotated manually or by using a cell starter or the like. The magnet 3 and the magnetic poles 4, in passing by the ignition coil assembly 5, induce high voltage AC pulses in the ignition coil assembly 5. The resulting AC pulses cause the ignition plug 7 of the internal combustion engine to produce a discharge spark, so that fuel in the cylinder is ignited. This ignition procedure is repeated, and the internal combustion engine continues to operate. Along with the operation of the internal combustion engine, the rotor 1 continuously rotates.

Figure 2:
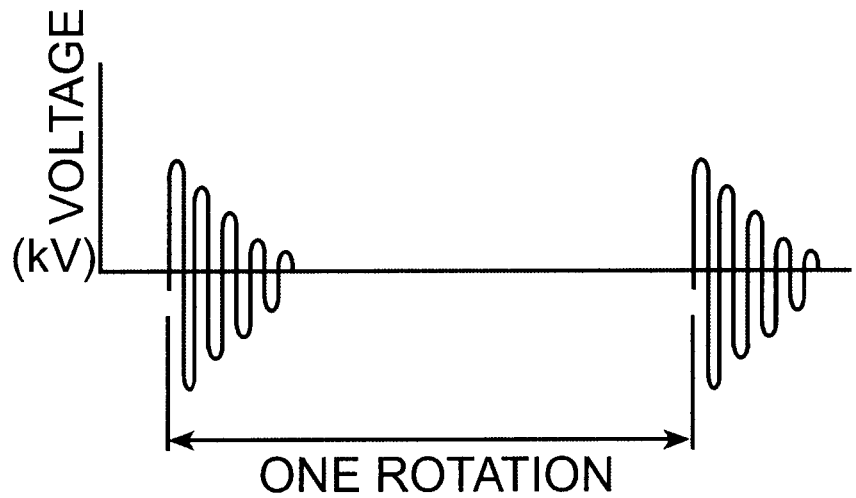
FIG. 2 is a waveform diagram of voltage pulses generated by the booster coil assembly shown in FIG. 1.
Figure 3:
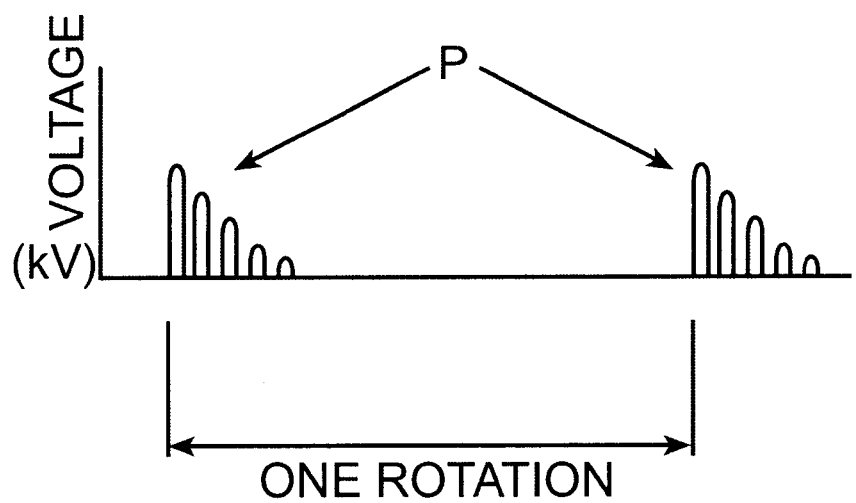
FIG. 3 is a waveform diagram of high voltage pulses rectified by the high voltage diode shown in FIG. 1.
Figure 4:
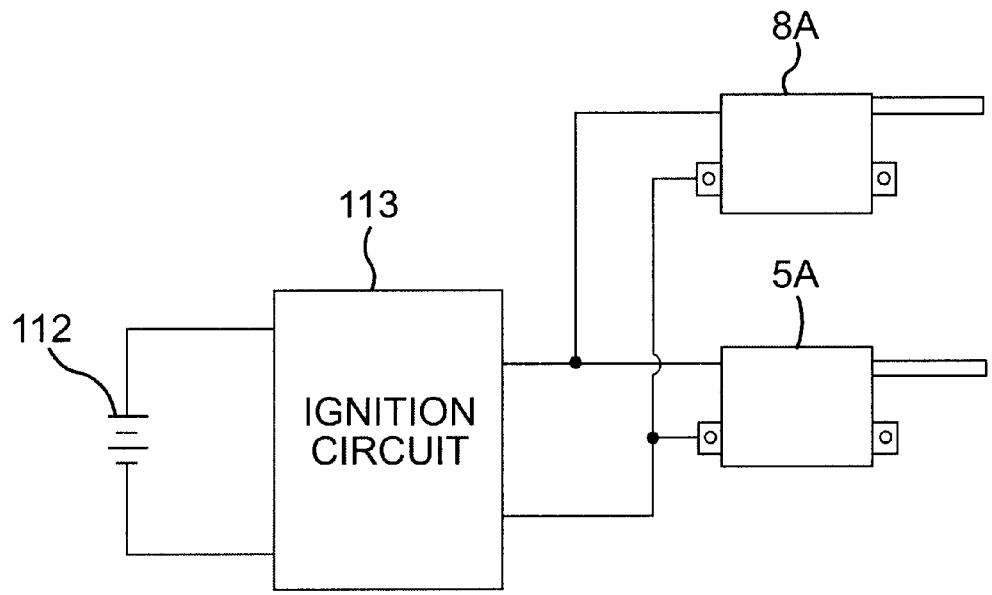
FIG. 4 is a schematic circuit diagram of a power supply apparatus According to another preferred embodiment of the present invention.
Figure 5:
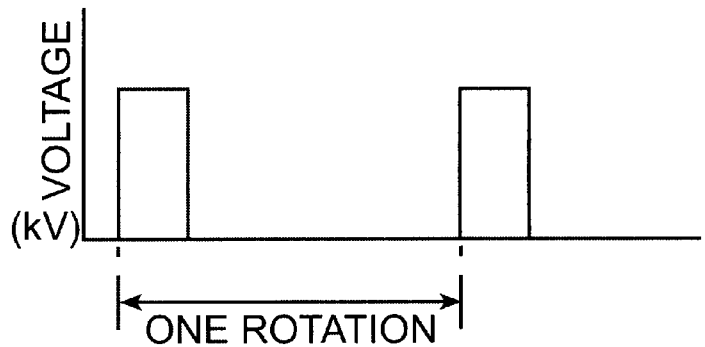
FIG. 5 is a waveform diagram of a possible voltage to be supplied to the charging electrode shown in FIG. 1.
Figure 6:
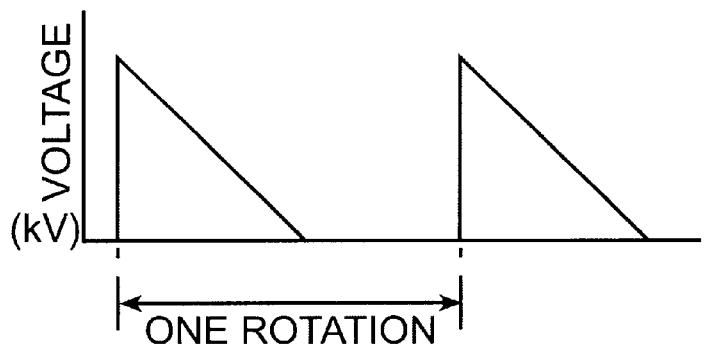
FIG. 6 is a waveform diagram of another possible voltage to be supplied to the charging electrode shown in FIG. 1.

During the rotation of the rotor 1, high voltage AC pulses depicted in FIG. 2 are consecutively induced in the booster coil assembly 8 positioned near the rotor 1. The resulting AC pulses are rectified (in FIG. 2, half-wave rectification is performed) by the high voltage diode 10 to high voltage DC pulses P depicted in FIG. 3, which are then supplied to the charging electrode 11. Therefore, by means of the pump 12 operated by the internal combustion engine, the liquid chemicals sprayed from the spray nozzle 13 can be charged with static electricity before being sprayed. In other words, electric power for effecting the electrostatic charging is derived from the internal combustion engine that drives the pump 12.

FIG. 4 shows another preferred embodiment in which a battery-based igniter is employed. The same and corresponding components as those in the previous embodiment are designated by the same reference numerals.

According to this embodiment, a compact and small-capacity battery 112 is used as a power supply for starting an internal combustion engine. A voltage of the power supply is boosted by an ignition circuit 113, and is then distributed to an ignition coil assembly 5A for the internal combustion engine.

In this embodiment, once the internal combustion engine is started, both the ignition pulses to be supplied to the ignition plug 7 and the high voltage pulses to be supplied to the charging electrode 11 are derived from the ignition circuit 113.

The rotation of the crankshaft 2 of the internal combustion engine allows electric power to be continuously supplied to the electrostatic sprayer. This continuous power supply eliminates the need for a large heavy battery, making the present invention more convenient to transport and less tiring to an operator. This configuration also reduces the overall cost of the device by eliminating the booster circuit used in the conventional device, which includes an expensive and complex inverter.

The high voltage AC pulses produced by the booster coil assembly 8 or 8A form waves as shown in FIG. 2, in a period of one rotation of the rotor 1. Alternatively, a square wave generator, such as a known multi-vibrator, may be used to generate square wave pulses as depicted in FIG. 5. Or, alternatively, an integral circuit may be used to form triangular wave pulses as depicted in FIG. 6. The charging electrode 11 may be supplied with such pulses.

In FIG. 1, a single high voltage diode 10 Acting as a rectifier is connected between the booster coil assembly 8 and the charging electrode 11. Instead of this configuration, alternately, a full-wave rectifying circuit having four high voltage diodes bridged to one another may be connected therebetween, as appropriate. Otherwise, a smoothing capacitor may be connected to these components if necessary.

Although the invention has been described through illustration of its preferred forms, it is to be understood that the described embodiments are only illustrative and that various changes and modifications may be imparted thereto without departing from the scope of the present invention, which is limited solely by the appended claims.

What is claimed is:

1. A power supply apparatus for electrostatic charging an electrode in an electrostatic spraying apparatus, the power supply apparatus comprising:

(a) a rotor;

(b) a magnet and magnetic poles embedded in the rotor, the magnet positioned between the magnetic poles;

(c) a booster coil assembly in communication with the magnet and the magnetic poles of the rotor;

(d) a rectifier connected to the booster coil assembly;

(e) a charging electrode connected to the rectifier, the charging electrode configured to electrostatically charge liquid at the time of spraying; and (f) a crankshaft on which the rotor is mounted, the crankshaft being driven by an internal combustion engine, wherein the sprayed liquid is a liquid that is different from any liquid employed to operate the internal combustion engine.

2. The power supply apparatus of claim 1, wherein the booster coil assembly generates high voltage AC pulses as the magnet and magnetic poles of the rotor pass by the booster coil assembly.

3. The power supply apparatus of claim 2, wherein the booster coil assembly generates one of wave pulses, square wave pulses, and triangular wave pulses.

4. The power supply apparatus of claim 2, wherein the rectifier rectifies the high voltage AC pulses to high voltage DC pulses that are supplied to the charging electrode.

5. The power supply apparatus of claim 2, wherein the rectifier is a diode having a cathode and an anode, wherein the cathode is connected to the charging electrode when a leading edge of the high voltage AC pulses rises, and wherein the anode is connected to the charging electrode when the leading edge of the high voltage AC pulses falls.

6. The power supply apparatus of claim 1, wherein the charging electrode is supplied with high voltage DC pulses.

7. The power supply apparatus of claim 6, wherein the high voltage DC pulses are on the order of 10 kV to 15 kV.

8. The power supply apparatus of claim 1, wherein the rectifier is a full-wave rectifying circuit having diodes bridged to each other.

9. The power supply of claim 1, further comprising:

(g) an ignition coil assembly in communication with the rotor, the ignition coil assembly generating high voltage AC pulses as the magnet and magnetic poles of the rotor pass by the ignition coil assembly; and (h) an ignition plug in communication with the ignition coil, the ignition plug producing sparks in response to the high voltage AC pulses received from the ignition coil assembly.

10. The power supply apparatus of claim 9, further comprising:

(i) a pump driven by the internal combustion engine; and (j) a spray nozzle in fluid communication with the pump and positioned near the charging electrode such that fluids exiting the spray nozzle are charged with static electricity.

11. The power supply apparatus of claim 9, further comprising:

(i) a battery for starting the internal combustion engine; and (j) an ignition circuit that boosts a voltage supplied by the battery and distributes the voltage to the ignition coil assembly, and wherein, when the internal combustion engine is running, the high voltage AC pulses supplied to the ignition plug and high voltage DC pulses supplied to the charging electrode derive from the ignition circuit.

12. The power supply apparatus of claim 11, wherein the rotor is mounted on a crankshaft of an air-cooled 2-cycle gasoline engine.

13. A power supply apparatus, which is itself powered by an internal combustion engine, for electrostatic charging an electrode configured to electrostatically charge sprayed liquids comprising:

(a) a booster that generates high voltage AC pulses;

(b) a rectifier in communication with the booster, wherein the rectifier receives the high voltage AC pulses and rectifies the high voltage AC pulses to high voltage DC pulses; and (c) a charging electrode in communication with the rectifier, wherein the charging electrode receives the high voltage DC pulses and wherein the charging electrode is configured to electrostatically charge sprayed liquids, wherein the sprayed liquids are liquids that are different from liquids employed to operate the internal combustion engine.

14. A power supply apparatus for electrostatic charging a liquid that is sprayed from a spraying apparatus, the power supply apparatus comprising:

(a) a rotor having a magnet and magnetic poles;

(b) a booster in communication with the rotor, wherein the booster generates high voltage AC pulses during rotation of the rotor; and (c) a rectifier that rectifies the high voltage AC pulses to high voltage DC pulses and supplies the high voltage DC pulses to a charging electrode, wherein the charging electrode is configured to electrostatically charge a liquid that is sprayed from the spraying apparatus, wherein an internal combustion engine operates the rotor and wherein the liquid that is sprayed is different from any liquid employed to operate the internal combustion engine.

15. The power supply apparatus of claim 14, wherein the rectifier comprises a high voltage diode for full-wave rectifying of the high voltage AC pulses.

16. The power supply apparatus of claim 14, wherein the rectifier comprises a high voltage diode for half-wave rectifying of the high voltage AC pulses.

17. The power supply apparatus of claim 14, wherein the internal combustion engine comprising:

(i) an igniter having an ignition coil, wherein the rotor is in communication with the ignition coil and the ignition coil induces high voltage pulses; and (ii) an ignition plug that receives the high voltage pulses from the ignition coil.

18. A method for supplying power for charging an electrode configured to electrostatically charge sprayed particles, the method comprising:

rotating a rotor near a booster coil assembly, the rotor having magnets and magnetic poles;

inducing high voltage AC pulses in the booster coil assembly;

rectifying the high voltage AC pulses to high voltage DC pulses;

supplying the high voltage DC pulses to a charging electrode;

pumping a liquid through a spray nozzle;

electrostatically charging the liquid with the electrode that is supplied with high voltage DC pulses; and mounting the rotor on a crankshaft of an internal combustion engine wherein the liquid that is pumped through the spray nozzle is different from any liquid employed to operate the internal combustion engine.

19. The method of claim 18, wherein the step of rotating the rotor comprises:

rotating the rotor near an ignition coil assembly;

inducing high voltage AC pulses in the ignition coil assembly;

supplying the high voltage AC pulses of the ignition coil assembly to an ignition plug; and producing sparks with the ignition plug that ignite fuel, drive the internal combustion engine, and turn the crankshaft and rotor.

* * * * *